Figure 1:
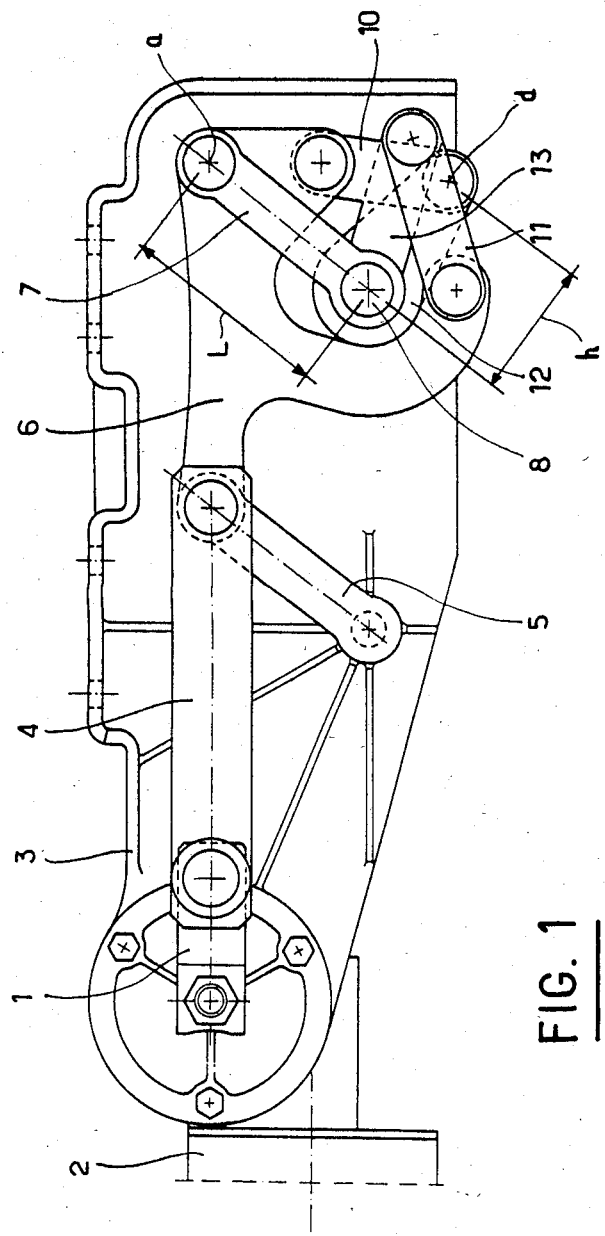

United States Patent [19]

Leroy et al.

[11] Patent Number: 4,584,734
[45] Date of Patent: Apr. 29, 1986

[54] WINDSCREEN WIPER SYSTEM

[76] Inventors: André R. Leroy, Chaussée de Binche 64, 7030 Mons Saint-Symphorien; Jean-Marie G. D. Flamme, Rue dela Délivrance 22, 7980 Beloeil Stambruges, both of Belgium

[21] Appl. No.: 703,479
[22] Filed: Feb. 20, 1985
[30] Foreign Application Priority Data
Feb. 28, 1984 [BE] Belgium .................................. 5/5264

[51] Int. Cl.4 .............................. B60S 1/24; B60S 1/28
[52] U.S. Cl. .............................. 15/250.21; 15/250.23; 15/250.27; 15/250.34; 15/250.41
[58] Field of Search ........... 15/250.21, 250.23, 250.27, 15/250.31, 250.41, 250.14

[56] References Cited
U.S. PATENT DOCUMENTS 2,607,944 8/1952 Turner et al. .................... 15/250.23
2,629,891 3/1953 Greene ............................. 15/250.23
2,775,780 1/1957 Pisano .......................... 15/250.41 X

FOREIGN PATENT DOCUMENTS 2215335 10/1973 Fed. Rep. of Germany ... 15/250.21
1561395 3/1969 France .............................. 15/250.23

Primary Examiner—Peter Feldman
Attorney, Agent, or Firm—Brisebois & Kruger

[57] ABSTRACT

A windscreen wiper system comprising a frame, a motor driven reducer, a bar drive mechanism and two windscreen wipers one of which has two controlled movements, one for sweeping, the other for extension-retraction. Said system comprises three coaxial shafts journalled to the frame, the arms of said two windscreen wipers are carried by two of said shafts which drive them with sweeping movements in the same direction, the extension-retraction is controlled from the third shaft driven with a reciprocating movement of the same frequency as the other two but in the opposite direction and said drive mechanism comprises three rocking levers fixed respectively to each of said coaxial shafts.

3 Claims, 5 Drawing Figures

WINDSCREEN WIPER SYSTEM

The invention relates to a windscreen wiper system, particularly for motor vehicles, comprising two windscreen wipers one of which has two controlled movements. The first of these movements is the usual movement for driving the arm in reciprocal rotation about a fixed shaft with respect to the windscreen wiped (wiping movement). The second movement is a relative movement of the wiper with respect to the arm; this movement is a reciprocal translational movement in a direction substantially parallel to the arm (extension-retraction movement).

The invention relates more especially to systems in which the twin movement windscreen wiper comprises a kinematic chain transforming a rotational movement about a shaft fixed with respect to the windscreen wiped into a relative translational movement of the wiper blade with respect to the arm. A system using such a windscreen wiper is described in French Pat. No. 1 561 395: in this system, the windscreen wiper with two controlled movements comprises a kinematic chain formed from a rocking lever driven with the input movement and a link pivotably connected to this rocking lever and to a slider which carries the wiper blade and slides along the arm. Another system using a dual movement windscreen wiper is described in Belgium Pat. No. 890467; in this system, the dual movement windscreen wiper comprises a spatial kinematic chain formed from a rocking lever driven with the input movement, a link pivotably connected to this rocking lever and a rocker arm pivotably connected to the arm, to the wiper blade and to the link.

In systems comprising two windscreen wipers one of which has two controlled movements, the sweeping movements and the extension-retraction movement may be controlled from three shafts driven with reciprocal rotational movements created from a motor driven reducer through an appropriate mechanism supported by a frame on which the three shafts are journalled. The invention relates to such systems, characterized in that the three shafts are coaxial, in that the sweeping movements are in the opposite direction to the movement creating the extension-retraction, and in that the driving mechanism is a bar mechanism, that is to say a mechanism formed exclusively from solids having generally slender shape connected together and, for some of them, to the frame by pivoting connections; by pivoting connection is meant here the technological construction of a theoretical connection having a rotoid, cylindrical or spherical character.

In the most general embodiment of the invention, the driving mechanism comprises three rocking levers fixed respectively to each of the coaxial shafts, as well as a bar, which we call main bar, pivotably connected directly to one of these rocking levers, which we call main rocking lever, and coupled to each of the other two rocking levers, which we call secondary rocking levers, by a coupling link. The main bar is further guided by a fourth rocking lever, which we call auxiliary rocking lever, which is pivotably connected to the frame. The assembly formed by the main bar, the main rocking lever and the auxiliary rocking lever form an open kinematic chain, connected for pivoting at two points of the frame and driven by a link-crank system; the crank of this system is fixed to the output shaft of the motor driven reducer and the corresponding link, which we call auxiliary link is connected for pivoting, on the one hand, to the crank and, on the other, to one of the three elements forming the preceding kinematic chain.

The invention is theoretically only operable if the geometry of the deformable quadrilateral formed by the main bar, the main rocking lever, the auxiliary rocking lever and the frame is such that the two following properties of the mechanism are respected:

a. the ends of travel of the three reciprocal movements are concomitant, b. the relative angles of the secondary rocking levers with respect to the main rocking lever are independent of the direction of rotation of the main rocking lever.

The first of these properties prevents any spurious power flow in the mechanism and permanently maintains the opposition of direction of these two movements for the windscreen wiper with two controlled movements. The second property automatically ensures coincidence of the surfaces swept by the windscreen wiper with two controlled movements in both directions of its sweeping movement, and automatically excludes any interference of the two windscreen wipers.

These two properties are automatically obtained in a particular version of the invention where the deformable quadrilateral formed from the main bar, the main rocking lever, the auxiliary rocking lever and the frame is identified with a parallelogram, so that the main bar is guided in a circular translational movement.

In order to simplify the drive mechanism, an approximative provision of these properties is sufficient and for this, without departing from the spirit of the invention the auxiliary rocking lever and link may be suppressed and the crank pivotably connected directly to the main bar. The thus simplified system will in general only be operable if the distance between the pivoting point of the main bar on the crank and its pivoting point on the main rocking lever is sufficiently large with respect to the length of the crank.

In all these variants, the windscreen wiper system of the invention has the following advantages:

a. the coaxial relation of the shafts facilitates fitting of the system into the bodywork of a vehicle and their location in the vicinity of the plane of symmetry of the vehicle permanently maintains the two windscreen wipers in an aerodynamically satisfactory position, b. location of the axis common to the three shafts in the plane of symmetry substantially simplifies adaptation of the vehicle to the two driving positions, c. the system combines the action of the two windscreen wipers so as to increase and not displace the swept surface and increases the frequency of the sweeps in a zone of maximum extension in front of the driver.

FIGS. 1 to 5 illustrate by way of non limitative example a particular embodiment of the invention, applied to the windscreen of a motor vehicle. FIGS. 1 to 5 show the windscreen wiper system in the stopped position.

Figure 2:
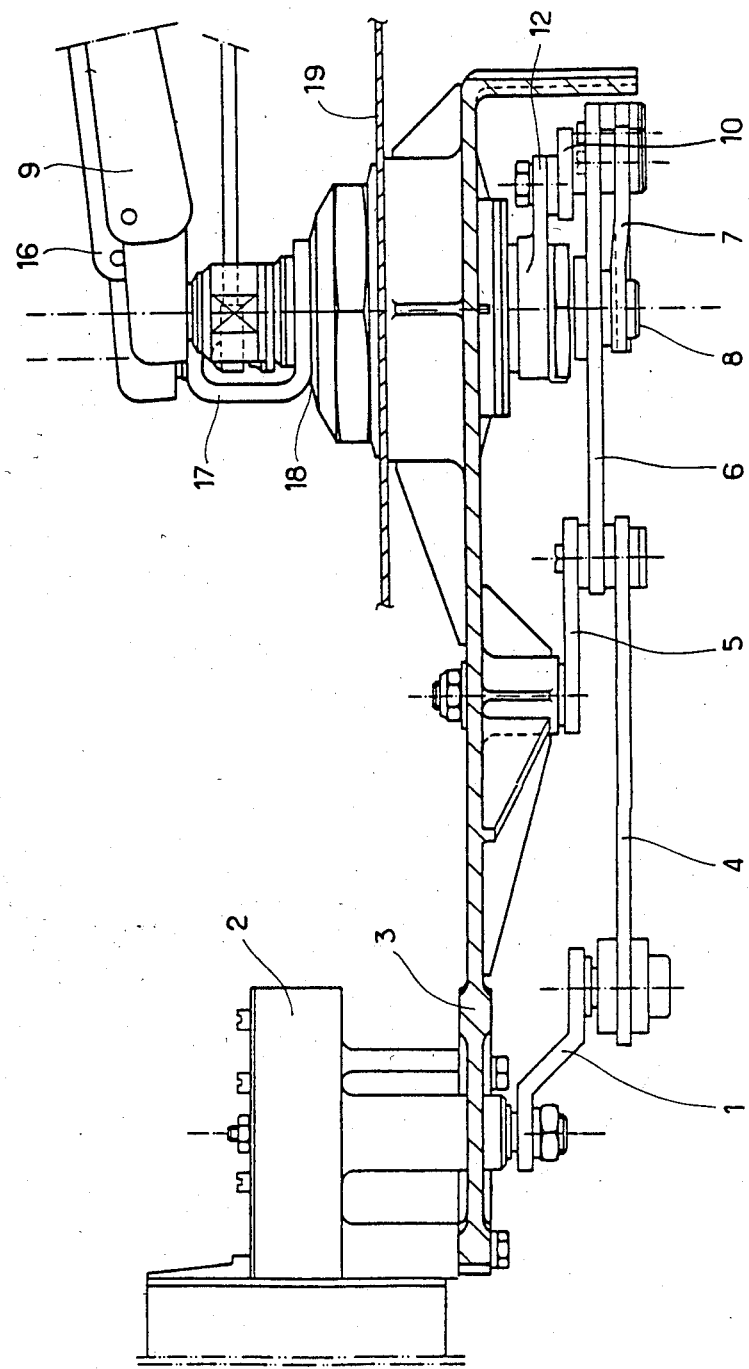
Figure 3:
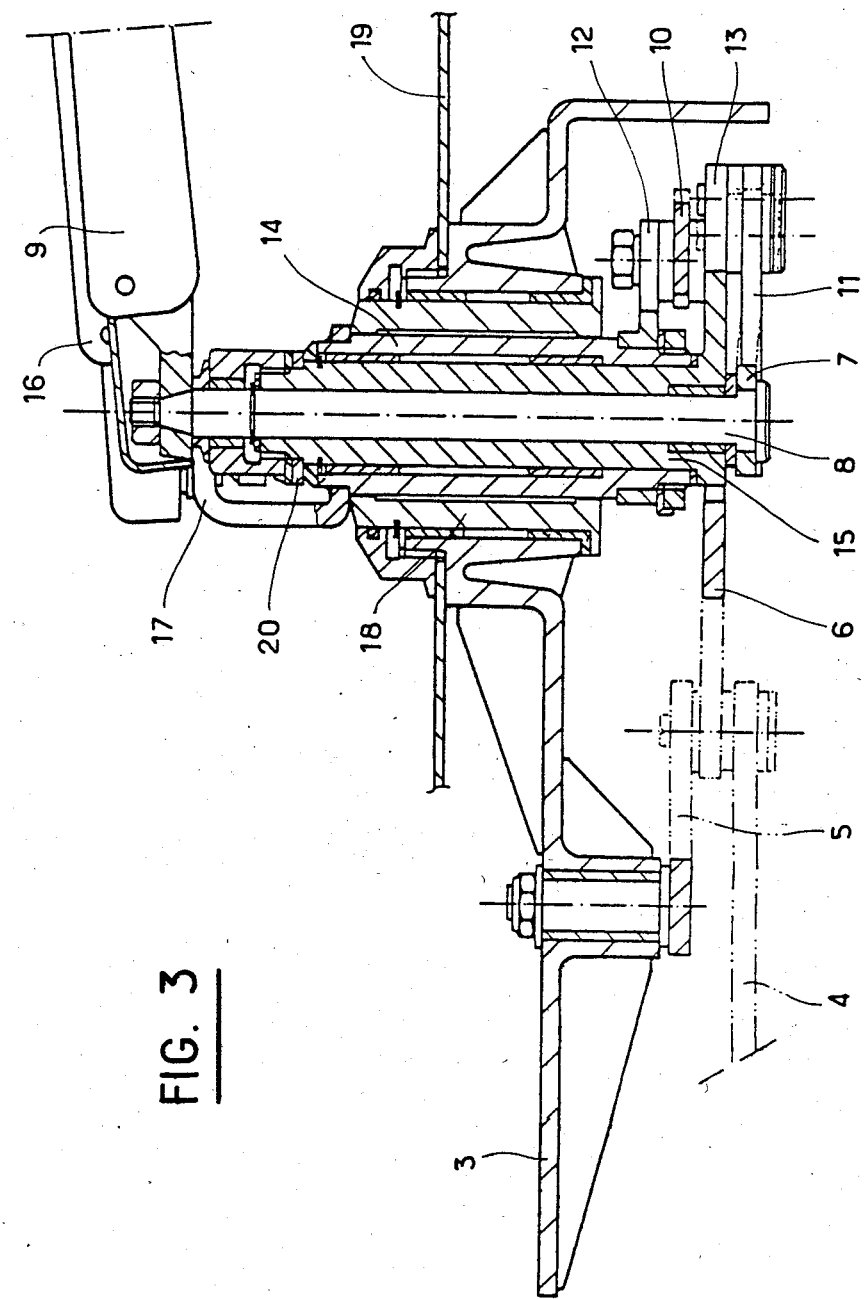
Figure 4:
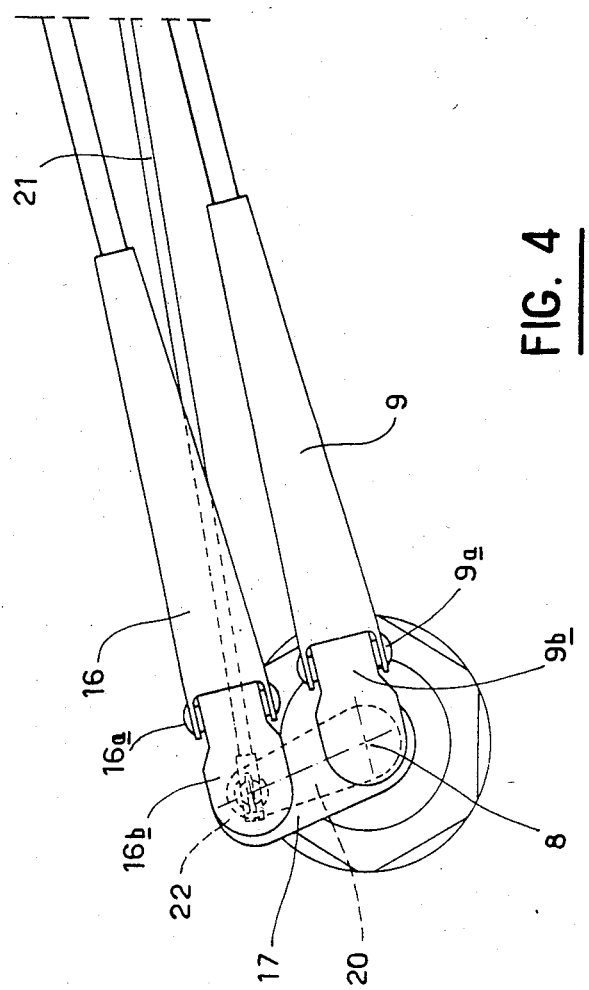
Figure 5:
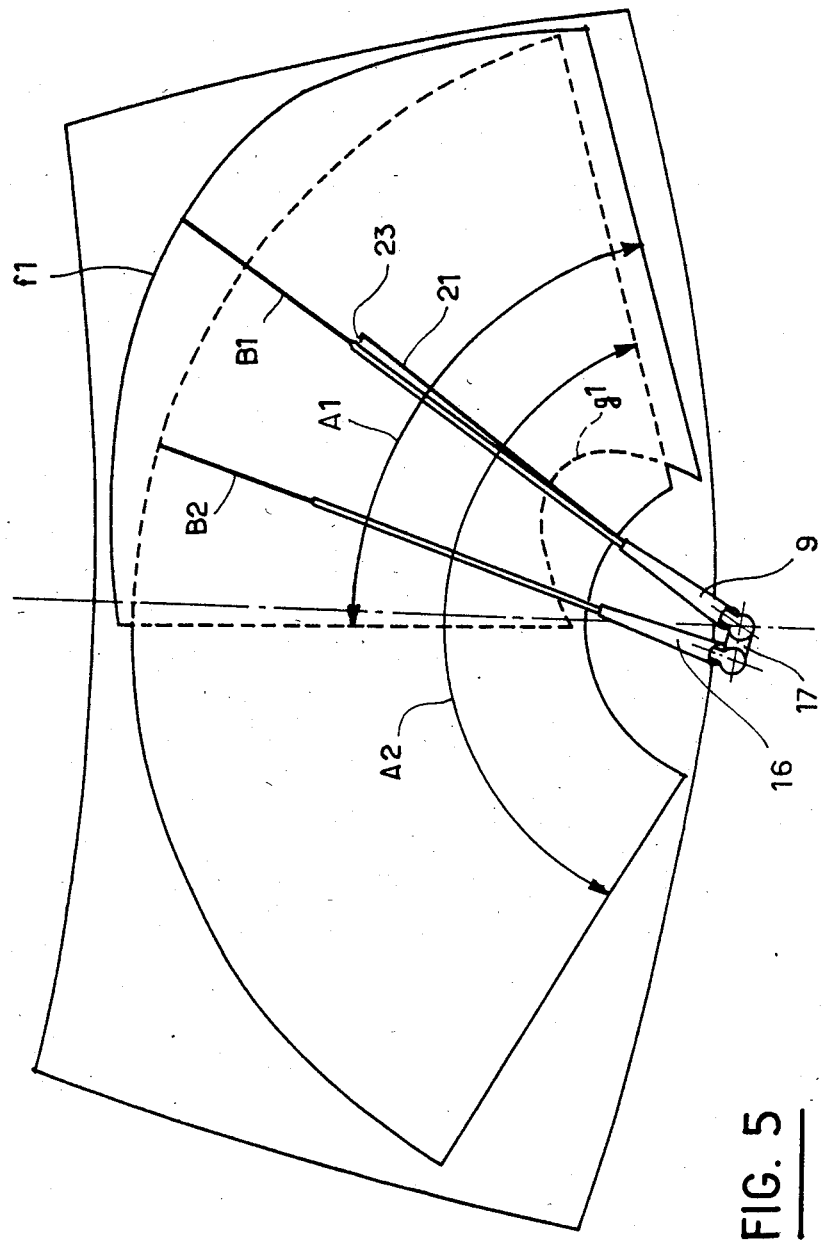

FIG. 1 is a view of the driving mechanism along the axis of the sweeping movements, FIG. 2 is a section of the windscreen wiper system through a plane parallel to the axis of the sweeping movements and located so as to show the whole of the driving mechanism, FIG. 3 is a sectional view of the system through a plane containing the axis of the sweeping movements and the axis of the pivotal connection of the auxiliary rocking lever with the frame, FIG. 4 is a partial view of the two windscreen wipers, FIG. 5 shows the surface swept by the windscreen wipers belonging to the system illustrated in the preceding Figures.

Crank 1 is driven with a continuous rotational movement by the motor driven reducer 2 mounted on frame 3 and, through the auxiliary link 4, drives the auxiliary rocking lever 5 here in rotoid connection with frame 3. The main bar 6 is pivotably connected to the auxiliary rocking lever 5 and to the main rocking lever 7, itself fixed to shaft 8 which carries and drives arm 9 of the windscreen wiper with two controlled movements. The main bar 6 has the form of a fork with two prongs at the ends of which are pivotably mounted the coupling links 10 and 11; in the position shown, the prongs of the main bar surround the axis of shaft 8. Links 10 and 11 are respectively pivotably connected to the secondary rocking levers 12 and 13 fixed respectively on the hollow shafts 14 and 15 coaxial with shaft 8. Shaft 14 carries and drives the arm 16 of the second windscreen wiper via the strap 17 which offsets it with respect to the axis common to the three shafts 8, 14 and 15 journalled to a spindle 18 of frame 3 which passes through the metal plate 19 of the bodywork of the vehicle. A shaft 15 carries and drives the rocking lever 20 which controls, through a kinematic chain not shown, the extension-retraction movement of the wiper blade along arm 9 of the windscreen wiper with two controlled movements.

The two wiper arms 9, 16 (see FIG. 4) are mounted for pivoting, in a conventional way, to a transverse pin 9a, 16a, carried by a head 9b, 16b. Head 9b of arm 9 is fixed for rotation on shaft 8.

Head 16b of arm 16 is interlocked for rotation with the strap 17, which is connected for rotation to shaft 14.

The kinematic chain controlling the extension and retraction movement of the wiper blade, along arm 9, (although it is not completely shown) comprises an auxiliary arm 21, partially shown in FIG. 4, formed from a sort of rod which is mounted for free rotation at one end on a pivot 22, fixed to rocking lever 20 and offset radially from the geometrical axis of shaft 8. The other end of rod 21 (see FIG. 5) is connected by a pivotable connection 23, more especially of the ball joint type, as described in Belgian Pat. No. 890467 already mentioned, to a rocker arm. This rocker arm is connected to the end of arm 9 for pivoting about a pin substantially parallel to the sweeping surface. This rocker arm carries the wiper blade B1 itself mounted on the rocker arm for pivoting about a pin also substantially parallel to the sweeping surface, more especially to the windscreen.

It should be noted that the description of Belgian Pat. No. 890467, to which reference is made, should be considered as incorporated in the present description.

Link 10 and the secondary rocking lever 12 are adapted so that the angular amplitude of the reciprocal rotational movement of the secondary rocking lever 12 is greater than the angular amplitude of the reciprocal movement of shaft 8. This increase in the angular amplitude depends, in particular, on the ratio of length L/h. In this ratio, L (FIG. 1) designates the distance between the geometrical axis of shaft 8 and the axis a of the pivoting connection of the main rocking lever 7 to the main bar 6, whereas h designates the distance between the geometrical axis of shaft 8 and the axis d of the pivotable connection of link 10 to rocking lever 12. This ratio L/h may be of the order of 1.5.

As mentioned above, if an approximative construction is sufficient, rocking lever 5 and the auxiliary link 4 may be suppressed and crank 1 mounted for pivoting directly on the main bar 6. It is then desirable, for the system to be suitable, for the distance between the pivoting connection of main bar 6 to crank 1 and its pivoting connection to the main rocking lever 7 to be sufficiently large with respect to the lengths of crank 1.

This being so, the operation of the windscreen wiper system is clear from the preceding explanations.

The continuous rotational movement of crank 1 is transformed into a reciprocal rotational movement of shaft 8, transmitted to arm 9.

Shaft 15, on which the secondary rocking lever 13 is fixed, is also driven with a reciprocal rotational movement but in a direction opposite to that of arm 9. The end of travel of the reciprocal movement of arm 15 and of the secondary rocking lever 13 is concomitant with that of shaft 8 (and shaft 14).

The result is a relative movement of pivot 22 and so of rod 21 with respect to arm 9. This relative movement controls the extension-retraction (by rocking of a rocker arm) of wiper blade B1 (FIG. 5) which has a non circular movement limited, outwardly by curve f1 and, inwardly, by curve g1. The angular amplitude of the sweeping movement of B1 is designated by A1 in FIG. 5. The wiper blade B2, driven by arm 16, will effect a circular movement of amplitude A2, greater than A1 as already explained above. The ends of travel of wiper blade B2 are concomitant with those of wiper blade B1.

For the end of travel situated towards the right in FIG. 5, wiper blade B2 is adjacent wiper blade B1, whereas for the other end of travel wiper blade B2 is towards the left hand lower edge of the windscreen, whereas wiper blade B1 is simply slightly above the axis of said windscreen.

Belgian Pat. No. 890467 mentioned above corresponds to the patent application U.S. Ser. No. 504,036 filed on the 22nd of September 1982.

We claim:

1. A windscreen wiper system comprising a frame, a motor driven reducer, a bar drive mechanism and two windscreen wipers one of which has two controlled movements, one for wiping, the other for extension-retraction, characterized in that it comprises three coaxial shafts journalled to the frame, in that the arms of the two windscreen wipers are carried by two of these shafts which drive them with sweeping movements in the same direction, in that the extension-retraction is controlled from the third shaft driven with a reciprocating movement of the same frequency as the other two but in the opposite direction, and in that the drive mechanism comprises three rocking levers fixed respectively to each of the coaxial shafts as well as a bar, called main bar, pivotably connected to one of these rocking levers, called main rocking lever, coupled to each of the other two rocking levers, called secondary rocking levers, by means of a coupling link and further guided by a fourth rocking lever, called auxiliary rocking lever, hingedly connected to the frame, the assembly formed by the main bar, the main rocking lever and the auxiliary rocking lever forming an open kinematic chain, connected for pivoting at two points to the frame, driven by a link-crank system whose crank is fixed to the output shaft of the motor driven reducer and whose so-called auxiliary link pivotably connected on the one hand to the crank is pivotably connected on the other hand to one of these three elements forming the preceding kinematic chain.

2. The windscreen wiper system according to claim 1, but characterized in that the geometry of the deformable quadrilateral formed by the main bar, the main rocking lever, the auxiliary rocking lever and the frame is identified with that of a parallelogram.

3. The windscreen wiper system according to claim 1, but characterized in that the drive system comprises neither rocking lever nor auxiliary link and in that the main bar is pivotably connected directly to the crank.

* * * * *